United States Patent
Yoshida et al.

(10) Patent No.: US 6,751,397 B1
(45) Date of Patent: Jun. 15, 2004

(54) VIDEO SIGNAL RECORDING AND PLAYING-BACK APPARATUS AND VIDEO SIGNAL DISPLAYING APPARATUS

(75) Inventors: Seiji Yoshida, Osaka (JP); Koji Hirose, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/259,655

(22) Filed: Feb. 26, 1999

(30) Foreign Application Priority Data

Feb. 27, 1998 (JP) .............................. 10-046990

(51) Int. Cl.[7] .................................. H04N 5/91
(52) U.S. Cl. .............................. 386/46; 386/83
(58) Field of Search ............... 386/1, 46, 83, 386/95; 348/571, 836, 738, 563, 569, 734

(56) References Cited

U.S. PATENT DOCUMENTS

| | | | |
|---|---|---|---|
| 4,831,449 A | * 5/1989 | Kimura | 348/738 |
| 5,285,265 A | 2/1994 | Choi | |
| 5,389,976 A | * 2/1995 | Miyagawa et al. | 348/571 |
| 5,499,115 A | * 3/1996 | Kojima et al. | 348/836 |
| 5,631,995 A | * 5/1997 | Weissensteiner et al. | 386/1 |
| 5,986,650 A | * 11/1999 | Ellis et al. | 348/563 |
| 5,991,498 A | * 11/1999 | Young | 386/83 |

FOREIGN PATENT DOCUMENTS

| | | |
|---|---|---|
| CN | 1144438 A | 3/1997 |
| EP | 505006 | 9/1992 |
| EP | 0535749 | 4/1993 |
| JP | 62-57375 | 3/1987 |

OTHER PUBLICATIONS

Peoples Republic of China Notice of Office Action for 99102452.4, dated Feb. 14, 2003 and English translation thereof.

* cited by examiner

Primary Examiner—Thai Tran
Assistant Examiner—Christopher Onuaku
(74) Attorney, Agent, or Firm—RatnerPrestia

(57) ABSTRACT

In a video signal recording and playing-back apparatus, a controller sets a preset time with a timer, and a first communicator transmits a message of starting the preset time to a video signal displaying apparatus when the time comes. In the video signal displaying apparatus, a second communicator receives the message from the first communicator, and a display controller instructs a display section to indicate the message of starting the preset time. The display section indicates the message regardless of a selection selected by a channel selector. A user can thus receive a notice of starting the preset time regardless of a present active channel on the video signal displaying apparatus.

16 Claims, 2 Drawing Sheets

VIDEO SIGNAL RECORDING AND PLAYING-BACK APPARATUS AND VIDEO SIGNAL DISPLAYING APPARATUS

FIELD OF THE INVENTION

The present invention relates to a video signal recording and playing-back apparatus that employs e.g. a magnetic tape, and also relates to a video signal displaying apparatus including a television receiver.

BACKGROUND OF THE INVENTION

Home-use video signal recording and playing-back apparatuses such as video cassette recorders have been coupled with video signal displaying apparatuses such as television receivers, and bi-directional communications therebetween have widely prevailed in the home-entertainment-market.

A conventional arrangement discussed above is hereinafter described with reference to FIG. 2.

First, an operation of conventional video cassette recorder (VCR) 110 is described. When an operation preset by a timer starts, controller 12 transmits the information of starting a preset time to display-instruction-section 11 and video-output-section 13. Display-instruction-section 11 sends a message of starting the preset time to video-output-section 13. Video-output-section 13 then sends the video signal and the message to outer-input-section 17 of conventional video signal displaying apparatus (TV) 210. If channel selector 15, which selects signals from tuner 16 or outer input section 17, selects the signals from outer input section 17 that receives signals from the VCR 110, display section 14 displays the video signal and message from the VCR 110. On the other hand, if channel selector 15 selects the signals from tuner 16 that receives on-air signals, display section 14 only displays the on-air signals.

The conventional structure discussed above, however, has a problem that a user does not notice when the preset time starts while the user watches the on-air signal on TV 210.

SUMMARY OF THE INVENTION

The present invention addresses the problem discussed above, and aims to provide a video signal recording and playing-back apparatus as well as a video signal displaying apparatus. These apparatuses can give a user a notice of starting a preset time with displaying a message when the time comes, regardless of the channel the user now watches.

The video signal recording and playing-back apparatus as well as the video signal displaying apparatus of the present invention has the following construction.

First, the video signal recording and playing-back apparatus (hereinafter referred to as a VCR) comprises the following two elements:

(a) a controller for recording and playing-back video signals; and
(b) a first communicator for transmitting the information responsive to an operation and/or a state of the controller to the video signal displaying apparatus.

Second, the video signal displaying apparatus (hereinafter referred to as a TV) comprises the following elements:

(c) a tuner for receiving on-air signals;
(d) an outer input section for receiving video signals from the VCR;
(e) a channel selector for selecting output signals from the tuner or the outer input section;
(f) a display section for displaying video signals tapped off from the channel selector;
(g) a second communicator for receiving the information transmitted from the first communicator; and
(h) a display controller for displaying the information received by the second communicator on the display section.

Regardless of the video signals selected by the channel selector, the construction discussed above allows the display section of the TV to indicate the operation or the state of the VCR.

The present invention thus can display the message that the VCR starts a preset time when the time comes regardless of the present active channel on the TV. In addition, the present invention can display various operations and states of the VCR on the display section of the TV, which effects user-friendly operations as well as operations adaptable to technical innovation.

DESCRIPTION OF THE PREFERRED EMBODIMENT

An exemplary embodiment of the present invention is described hereinafter with reference to the accompanying drawing.

Figure 1:
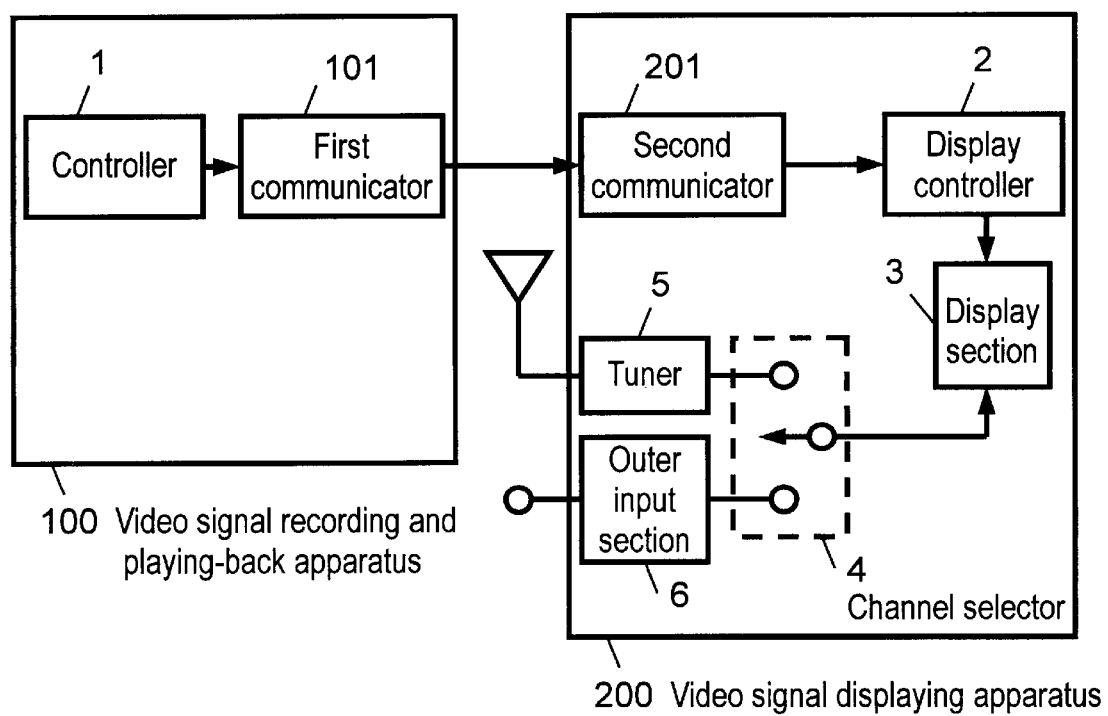
FIG. 1 is a block diagram illustrating a video signal recording and playing-back apparatus as well as a video signal displaying apparatus of the present invention.
Figure 2:
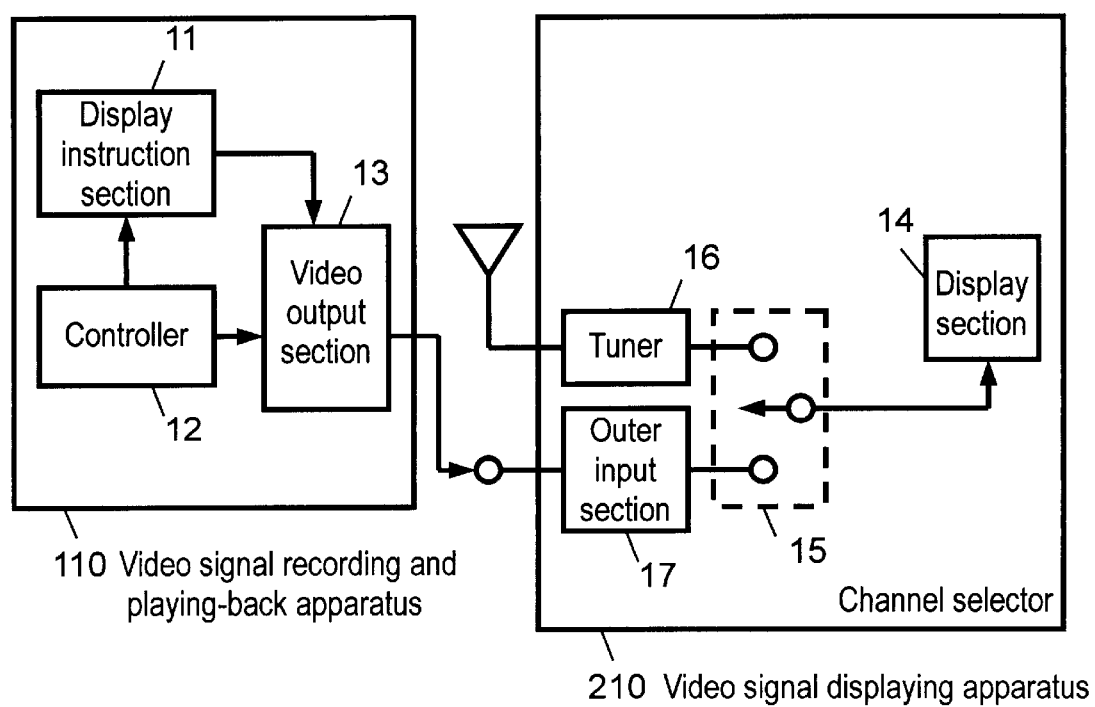
FIG. 2 is a block diagram illustrating a conventional video signal recording and playing-back apparatus as well as a conventional video signal displaying apparatus.

As shown in FIG. 1, video signal recording and playing-back apparatus 100 (hereinafter referred to as a VCR) comprises the following two elements:

(a) controller 1 for recording and playing-back video signals; and
(b) first communicator 101 for transmitting the information responsive to an operation or a state of controller 1.

For instance, a user selects "record" or "play back" by pressing one of the operation buttons arranged a front panel of VCR 100. Controller 1 sends information to each section such as a recording section, play-back section, and others based on this user's selection in order to operate apparatus 100.

Video signal displaying apparatus 200 (hereinafter referred to as a TV) comprises the following elements:

(c) tuner 5 for receiving on-air signals;
(d) outer input section 6 for receiving video signals from VCR 100;
(e) channel selector 4 for selecting output signals from tuner 5 or outer input section 6;
(f) display section 3 for displaying video signals tapped off from channel selector 4;
(g) second communicator 201 for receiving the information transmitted from first communicator 101; and
(h) display controller 2 for displaying the information received by second communicator 201 on display section 3.

An operation of the VCR and the TV discussed above is described hereinafter.

First communicator 101 has a connector which mates with a cable for transmitting digital codes. Second communicator 201 has a connector which mates with a cable for receiving the digital codes from first communicator 101. First and second communicators 101 and 201 are coupled with a cable commercially available, e.g. 21 pin skirt-cable that is employed, for example, between a VCR and a TV for playing back pictures.

Some messages are set in advance corresponding to operations of VCR 100. Display controller 2 instructs display section 3 to indicate one of these messages responsive to the digital code from second communicator 201. To be more specific, display controller 2 is, for example, the character generator controlling IC made by Texas Instruments, and the IC controls the on-screen-display IC employed in VCRs and TVs.

Assume that a user presets a time in VCR 100 for recording a program automatically when the time comes. In this case, the preset time is set in VCR 100 by the user. When the time comes, first communicator 101 transmits a message of starting the preset time to second communicator 201 of TV 200. Display controller 2 receives the message and instructs display section 3 to indicate the message of starting the preset time only for five seconds. Upon receiving this instruction, display section 3 indicates the message whichever video signals either from tuner 5 or outer input section 6 are selected by channel selector 4.

The messages for on-screen-display are generated, for instance, by the following method. The digital code is sent to the character generator controlling IC, which is one of the elements of display controller 2 and controls the on-screen-display IC for a TV.

The messages can be displayed on a picture, for instance, by the same method that displays a channel number of the TV, i.e. the superimposing method.

As such, providing first communicator 101, second communicator 201 and display controller 2 enables display section 3 to indicate the message of starting the preset time when the time comes regardless of the present active channel on TV 200.

In the foregoing exemplary embodiment, a preset time is discussed; however, various information regarding the operations and/or states of VCR 100 can be indicated on display section 3 of TV 200 when necessary.

VCR 100 and TV 200 can be incorporated into one machine.

What is claimed is:

1. A video signal recording and playing-back apparatus and a video signal displaying apparatus, said video signal recording and playing-back apparatus comprising:
    (a-1) a controller for controlling a video signal; and
    (a-2) a first communicator for transmitting information, including information that said video signal recording and playing-back apparatus starts at a preset time, responsive to an operation or a state of said controller, and
said video signal displaying apparatus comprising:
    (b-1) a tuner for receiving an on-air signal;
    (b-2) an outer input section for receiving the video signal from said video signal recording and playing-back apparatus;
    (b-3) a channel selector for selecting an output signal from one of said tuner and said outer input section;
    (b-4) a display section for displaying the video signal outputted from said channel selector;
    (b-5) a second communicator for receiving the information transmitted from said first communicator; and
    (b-6) a display controller for displaying the information received by said second communicator on said display section,
wherein at least one of an operation and a state of said video signal recording and playing-back apparatus, received by said second communicator from said first communicator, is displayed on said display section regardless of the output signal selected by said channel selector being of said tuner or said outer input section and displayed on said display section, and independent of the operation of said channel selector.

2. The video signal recording and playing-back apparatus and video signal displaying apparatus of claim 1, wherein said display controller is a character generator.

3. The video signal recording and playing-back apparatus and video signal displaying apparatus of claim 1, wherein said at least one of an operation and a state of said video signal recording and play-back apparatus is displayed as a message on said display section.

4. The video signal recording and playing-back apparatus and video signal displaying apparatus of claim 1, wherein said first communicator transmits information as digital codes to said second communicator.

5. The video signal recording and playing-back apparatus and video signal displaying apparatus of claim 1, wherein said video signal recording and playing-back apparatus is a video cassette recorder.

6. The video signal recording and playing-back apparatus and video signal displaying apparatus of claim 1, wherein said video signal displaying apparatus is a television.

7. The video signal recording and playing-back apparatus and video signal displaying apparatus of claim 1, wherein said video signal recording and playing-back apparatus and said video signal displaying apparatus are separate electronic units.

8. The video signal recording and playing-back apparatus and video signal displaying apparatus of claim 1, wherein said video signal recording and playing-back apparatus and said video signal displaying apparatus are combined in an integral electronic unit.

9. A video signal recording and playing-back apparatus comprising:
    (a-1) a controller for controlling a video signal;
    (a-2) a video output section for outputting a video signal responsive to said controller; and
    (a-3) a first communicator for transmitting information, including information that said video signal recording and playing-back apparatus starts at a present time, responsive to an operation or a state of the controller,
wherein a video signal displaying apparatus comprises the following elements:
    (b-1) a tuner for receiving an on-air signal;
    (b-2) an outer input section for receiving a video signal;
    (b-3) a channel selector for selecting an output signal from one of said tuner and said outer input section;
    (b-4) a display section for displaying the video signal outputted from said channel selector;
    (b-5) a second communicator for receiving information transmitted from said first communicator; and
    (b-6) a display controller for displaying the information received by said second communicator on said display section,
wherein said video signal recording and playing-back apparatus outputs the video signal from said video output section to said outer input section,
wherein said first communicator transmits the information, including information that said video signal recording and playing-back apparatus starts at a present time, responsive to the operation and the state of said controller to said second communicator, and wherein said video signal recording and playing-back apparatus allows said display section to indicate at least one of the operation and the state of said controller, received by said second communicator from said first communicator, displayed on said display section regardless of the output signal selected by said channel selector being of said tuner or said outer input section and displayed on said display section, and independent of the operation of said channel selector.

10. The video signal recording and playing-back apparatus of claim 9, wherein said display controller is a character generator.

11. The video signal recording and playing-back apparatus of claim 9, wherein said at least one of an operation and a state of said video signal recording and play-back apparatus is displayed as a message on said display section.

12. The video signal recording and playing-back apparatus of claim 9, wherein said first communicator transmits information as digital codes to said second communicator.

13. The video signal recording and playing-back apparatus of claim 9, wherein said video signal recording and playing-back apparatus is a video cassette recorder.

14. The video signal recording and playing-back apparatus of claim 9, wherein said video signal displaying apparatus is a television.

15. The video signal recording and playing-back apparatus of claim 9, wherein said video signal recording and playing-back apparatus and said video signal displaying apparatus are separate electronic units.

16. The video signal recording and playing-back apparatus of claim 9, wherein said video signal recording and playing-back apparatus and said video signal displaying apparatus are combined in an integral electronic unit.

* * * * *